UNITED STATES PATENT OFFICE.

JOHN HERBERT THWAITES, OF PETERBOROUGH, ENGLAND.

WET METHOD OF SEPARATING METALLIC COMPOUNDS.

935,337.  Specification of Letters Patent.  Patented Sept. 28, 1909.

No Drawing.  Application filed July 8, 1908.  Serial No. 442,518.

*To all whom it may concern:*

Be it known that I, JOHN HERBERT THWAITES, a subject of the King of Great Britain, residing at Market Chambers, Peterborough, in the county of Northampton, England, chemical engineer, have invented certain new and useful Improvements in Wet Methods of Separating Metallic Compounds, of which the following is a specification.

This invention has for its object improvements in commercial methods of separating metallic compounds from solutions containing one or more metals, whereby certain separations are carried out more quickly and more cleanly, or are carried out in a manner which gives precipitates that are more easily filtered off or otherwise separated from the liquid, than is the case with the methods usually employed; and also, if desired, compounds of only one metal, namely zinc, are used throughout for these separations, and this metal can be recovered in various ways and used over again.

Sulfureted hydrogen gas is often used to throw out of solution certain metals in the form of sulfids, which are completely precipitated from acid solutions by this gas. The chief metals which behave in this manner are copper, lead, mercury, silver, arsenic, antimony, tin, bismuth, and cadmium. On a large scale the operation is by no means easy or safe, as the gas is poisonous, and after a few inhalations its presence cannot for the time being be perceived by the sense of smell; the precipitation takes a long time for completion, and the precipitates produced are very bulky and difficult to deal with; the solution must be of acid reaction to prevent certain other metals from being precipitated, and must be strongly acid under certain well-known conditions. If soluble sulfids are used instead of sulfureted hydrogen, an excess of acid must be maintained, and there is practically always an escape of sulfureted hydrogen which is both a loss and a nuisance, and a local excess of the soluble sulfid may cause the precipitation of certain metals, such as cobalt and nickel, which is not desired, and which cannot be remedied usually by a moderate excess of acid, for once the sulfids of these two metals are precipitated, dilute acids will not re-dissolve them generally.

Scrap iron is in some cases used instead of sulfureted hydrogen, to remove certain of the metals named above, such as copper, but some metals such as cadmium are not precipitated by metallic iron. This method introduces iron salts into the solution remaining, and the precipitate obtained is also contaminated with iron. Metallic zinc is also sometimes used, but in the case of both metallic iron and metallic zinc a large amount of tank or other space is necessary, and a considerable time is required to remove the last traces of the precipitable metals. Instead of using any of these means by this invention I take advantage of the fact which I have discovered, that zinc sulfid, a known precipitant for certain of the heavy metals, may be applied to precipitate from a liquor containing a number of heavy metals, compounds of these metals in several successive groups by causing the zinc sulfid to act on the liquor under successively varied conditions.

I use zinc sulfid preferably recently precipitated. It is added to the substantially neutral solution as a fine powder or as a cream or milk, or otherwise as may be found most convenient, and it is economical, both of time and of zinc sulfid, to use an apparatus which provides agitation and which has an arrangement by means of which the formation of small cores of the precipitant is prevented or cured. Such an apparatus is simple, and it can be constructed for continuous instead of intermittent work if desired. The following metals, or such of them as may be present, are completely thrown down as sulfids in the cold or hot:— silver, lead, mercury, copper, bismuth and tin, and when present in their capacities of bases or lower oxygen acids, arsenic and antimony as well; whereas cadmium is not thrown down unless the temperature is raised to near the boiling point, so that a handy means of separating this metal from the others just mentioned is afforded, which is not the case if sulfureted hydrogen is used. Arsenic and antimony present as arsenates and antimonates are only precipitated by zinc sulfid from solutions which are decidedly acid.

To precipitate arsenic and antimony from arsenates and antimonates, the solution must be decidedly acid; in which case zinc sulfid behaves just as sulfureted hydrogen, throwing down the same metals, including cadmium in the cold as well as in the hot; but there are these differences—there need be practically no evolution of sulfureted hydrogen gas, the precipitation is practically instantaneous, even with arsenates, and the precipitates are less bulky.

The following equations are typical of the reactions which take place:—

$$CuSO_4 + ZnS = CuS + ZnSO_4$$
$$PbCl_2 + ZnS = PbS + ZnCl_2$$
$$2AsCl_3 + 3ZnS = As_2S_3 + 3ZnCl_2$$
$$2Na_3AsO_3 + 3ZnS = As_2S_3 + 3Na_2ZnO_2$$
$$CdCl_2 + ZnS = CdS + ZnCl_2$$
$$2NaSbO_2 + 3ZnS + 8HCl =$$
$$Sb_2S_3 + 3ZnCl_2 + 2NaCl + 4H_2O.$$

When any metal is precipitated by means of zinc sulfid an equivalent amount of zinc dissolves in the solution, and any excess of the precipitant which has been used can be dissolved out of the precipitate by treating it with very dilute acid; in most cases this can be done before the precipitate is filtered off, or otherwise removed from the liquid or the precipitate may be added to the next batch of liquor in order to use up its contained excess of zinc sulfid.

It will be understood that sufficient zinc sulfid is added to the liquor to determine the precipitation of the sulfid as aforesaid, and unless an analysis of the liquor has been made so as to render possible a calculation of the amount of zinc sulfid required according to principles well known to chemists, a trial should be conducted on a small portion in order to ascertain what quantity of zinc sulfid is to be added to the bulk to avoid using an unnecessary excess. All the reactions of zinc sulfid herein described are practically instantaneous, the one essential condition being that the reagent is thoroughly mixed with the liquors in question, lumps being avoided.

By the use of zinc sulfid a very convenient means is thus provided for completely separating all the above-named metals except nickel, cobalt, iron and chromium, from all the other commonly-occurring metals, and in such a manner that they may themselves be divided into three groups, namely silver, lead, mercury, copper, bismuth and tin in one; cadmium in another; and arsenic and antimony in the third, each group being obtained as a separate precipitate. This separation into three groups is not afforded directly by sulfureted hydrogen, while all the subsequent separations following treatment with that gas are equally applicable where zinc sulfid has been used in its stead. At the same time, the second group containing cadmium, can be obtained if desired in the same precipitate as either the first or the third group, under the conditions set forth above.

The metals are precipitated as sulfids, and the quantity of zinc sulfid necessary to precipitate them is easily calculated from the well known chemical equivalents.

The following would be a treatment under this invention of 1 cubic meter of a substantially neutral liquor obtained from zinciferous pyrites cinder by roasting with common salt, and containing per liter 21.2 grams of copper, 2.8 grams of cadmium, and 2.5 grams of arsenic as sodium arsenate ($Na_2HAsO_4$). The equation illustrating the precipitation of the arsenic is as follows:

$$2Na_2HAsO_4 + 5ZnS + 14HCl =$$
$$As_2S_3 + S_2 + 4NaCl + 5ZnCl_2 + 8H_2O.$$

The quantities of zinc sulfid necessary to precipitate the copper, cadmium and arsenic, are 32.5 kgs., 2.44 kgs., and 8.12 kgs., respectively. 32.5 kilos of zinc sulfid are added to the cubic meter of liquor, and the resulting precipitate, containing 21.2 kgs. of copper, is filtered off. 2.44 kgs. more of zinc sulfid is added to the filtrate which is heated nearly to boiling (say 90° C.) either before or after the addition, the only condition being that the liquor is at such temperature while the zinc sulfid is present; the resulting precipitate, containing 2.8 kgs. of cadmium as sulfid, is filtered off. To the filtrate is then added 8.12 kgs. more of zinc sulfid and either sulfuric or hydrochloric acid equivalent to at least 8.5 kgs. of pure HCl, when the 2.5 kgs. of arsenic is precipitated as sulfid.

The following would be a treatment under this invention of 1 cubic meter of a substantially neutral liquor containing per liter 10.8 grams of silver, 1.03 grams of lead, and 2.5 grams of arsenic. The quantities of zinc sulfid necessary to precipitate these metals out of the cubic meter are 4.87, 0.49 and 8.12 kgs., respectively.

5.36 kilos of zinc sulfid is added to the liquor, and the resulting precipitate, containing 10.8 kilos of silver and 1.03 kilos of lead, as sulfids, is filtered off. The 2.5 kgs. of arsenic left in the filtrate is precipitated out by the addition of 8.12 kgs. more of zinc sulfid together with sulfuric or hydrochloric acid equivalent to at least 8.12 kgs. of pure HCl.

Having thus described the nature of my said invention and the best means I know of carrying the same into practical effect, I claim:—

1. A process for separating sulfids of silver, lead, mercury, copper, bismuth, tin, cadmium, arsenic and antimony into three groups, one group containing silver, lead, mercury, copper, bismuth and tin, the second group containing cadmium, and the third group containing arsenic and antimony, each group consisting of a separate precipitation, which process consists in treating a substantially neutral liquor containing the compounds with zinc sulfid, removing from the liquor the precipitate formed, and treating the liquor with acid and zinc sulfid.

2. A process for separating into groups sulfids of silver, lead, mercury, copper, bismuth, tin, cadmium, arsenic and antimony, which process consists in treating a cold, substantially neutral liquor containing the compounds with zinc sulfid, removing from the liquor the precipitate formed, heating the liquor, treating the heated liquor with more zinc sulfid, removing the precipitate from the liquor, and treating the liquor with acid and zinc sulfid.

3. A process for separating into groups sulfids of silver, lead, mercury, copper, bismuth, tin, cadmium, arsenic and antimony, which process consists in treating a cold, substantially neutral liquor containing the compounds with zinc sulfid, removing from the liquor the precipitate formed, heating the liquor and treating the heated liquor with more zinc sulfid.

In testimony whereof I have signed my name to this specification in the presence of two subscribing witnesses.

JOHN HERBERT THWAITES

Witnesses:
GEO. J. B. FRANKLIN,
W. J. SKERTEN.